United States Patent [19]

Huang

[11] 4,450,092

[45] May 22, 1984

[54] REDUCING TURBIDITY IN TURBID WATERS

[75] Inventor: Shu-Jen W. Huang, Schaumburg, Ill.

[73] Assignee: Nalco Chemical Company, Oak Brook, Ill.

[21] Appl. No.: 387,546

[22] Filed: Jun. 11, 1982

[51] Int. Cl.³ .............................................. C02F 5/12
[52] U.S. Cl. ..................... 252/181; 210/725; 210/728; 210/735; 210/736
[58] Field of Search ................. 252/181; 210/725, 728, 210/735, 736

[56] References Cited

U.S. PATENT DOCUMENTS 3,412,019 11/1968 Hoover et al. ....................... 526/287
3,953,330 4/1976 Tonkyn et al. ....................... 210/728
3,994,806 11/1976 Rausch et al. ....................... 210/728
4,308,149 12/1981 Selvarajan ........................... 210/735

*Primary Examiner*—John E. Kittle
*Assistant Examiner*—Robert A. Wax
*Attorney, Agent, or Firm*—Richard L. Johnston

[57] ABSTRACT

Compositions useful for coagulating finely divided solids in turbid waters are prepared by mixing or blending together inorganic water soluble compounds such as aluminum chloride, aluminum sulfate, ferric chloride or ferric sulfate and water soluble organic positively charged polymeric coagulants having an average molecular weight of at least 2000 which is polydiallyl dimethylammonium chloride polymer. The compositions are especially useful for treating low turbidity waters, for example, waters having a turbidity of 20 NTU (nephelometric turbidity units).

15 Claims, No Drawings

REDUCING TURBIDITY IN TURBID WATERS

BACKGROUND

It is well known in the art to clarify raw turbid waters containing kaolin or other finely divided suspended solids with various inorganic compounds and water soluble organic positively charged polymeric coagulants which are used independently of one another. In general, for high turbidity waters containing, for example 200 parts per million (ppm) kaolin, such organic coagulants are effective in reducing turbidity. In low turbidity waters, for example, those containing 20 ppm kaolin, the organic coagulants alone are not as effective. Cost effectiveness is also a problem in water clarification.

It is therefore desirable to provide a new and improved process and new and improved products which are effective in clarifying water and at the same time are cost effective.

BRIEF SUMMARY OF THE INVENTION

In accordance with the invention compositions are provided which are useful for coagulating finely divided solids in turbid waters and are prepared by mixing or blending together inorganic water soluble compounds such as aluminum chloride, aluminum sulfate, ferric chloride or ferric sulfate and water soluble organic positively charged polymeric coagulants having an average molecular weight of at least 2000 which is a polydiallyl dimethylammonium chloride polymer. The compositions are especially useful for treating low turbidity waters, for example, waters having a turbidity of 20 NTU (nephelometric turbidity units).

DETAILED DESCRIPTION OF THE INVENTION

Aluminum chloride ($AlCl_3$) is available commercially as a 23% solution in water. It is also available in anhydrous form.

Aluminum sulfate or alum, $Al_2(SO_4)_3 \cdot 18H_2O$, is available in solid form and can readily be dissolved in water.

Ferric chloride, ($FeCl_3$), is available commercially as a solid and can readily be dissolved in water.

Ferric sulfate, $Fe_2(SO_4)_3$, is also readily available either in solid form or can be dissolved in water to form an aqueous solution.

Usually, for the purpose of the invention, it is preferable to employ the inorganic component of the composition as an 18–40% by weight aqueous solution, preferably 18–25% by weight.

The preferred high molecular weight polydiallyl dimethylammonium chloride polymer has an intrinsic viscosity of 0.8 and a molecular weight of approximately 100,000. The preferred dimethylamine epichlorohydrin-ethylenediamine polymer is available commercially as a 47% by weight polymer in aqueous solution. The high molecular weight polydiallyl dimethylammonium chloride polymer is available commercially as a 20% by weight polymer in aqueous solution. These polymers are positively charged. Other polymers of a similar type with intrinsic viscosities usually within the range of 0.08 to 1.0 can be employed for the practice of the invention.

Since the compositions employed for the purpose of the invention are used in very small dosages measured in terms of parts per million (ppm) of the water being treated, it is desirable from the standpoint of application to prepare the compositions in the form of aqueous solutions. In preparing these solutions it is preferable to prepare the inorganic component separately as an aqueous solution having 18–25% by weight solids concentration, although the solids concentration may go as high as 40% by weight, and to mix or blend this solution and the water soluble organic positively charged polymeric coagulant component, which has also been previously dissolved or occurs commercially, in aqueous solution.

In general, the weight ratio of the inorganic component to the organic component of the compositions prepared in accordance with the invention and utilized to clarify turbid waters is within the range of 0.75:1 to about 4:1 and the water present in the solutions containing said components will vary from about 30% by weight to about 57% by weight.

The invention will be further illustrated but is not limited by the following example in which the quantities are by weight unless otherwise indicated.

EXAMPLE

A series of compositions was prepared for testing and clarifying turbid waters by mixing $AlCl_3$ in the form of a 23% by weight aqueous solution with a high molecular weight polydiallyl dimethylammonium chloride polymer having an intrinsic viscosity of 0.8 and an average molecular weight of approximately 100,000 in a 20% by weight aqueous solution in weight proportions varying from 95:5 to 50:50, and the resultant compositions were tested for clarifying raw water containing 200 parts per million (ppm) kaolin in order to determine the amounts of the additive required to reduce the turbidity to 10 NTU. Separate tests on the same type of water for the same purpose were carried out with the aluminum chloride solution alone and with the organic polymer solution alone. The aluminum chloride solution alone required 17.4 ppm to reduce the turbidity to 10 NTU. The organic polymer solution alone required 1.2 ppm to reduce the turbidity to 10 NTU. The 95:5 composition required an average of 7.3 ppm. The 90:10 composition required an average of 4.6 ppm; the 80:20 composition required an average of 4.1 ppm; the 70:30 composition required an average of 3 ppm; the 60:40 composition required an average of 2.9 ppm, and the 50:50 composition required an average of 2.7 ppm.

It appears from these results that the mixture of the inorganic component and the organic component has a synergistic effect. From a practical standpoint this fact seems to be most important when the ratio of inorganic component to organic component is within the range of 80:20 to 50:50.

Stability of the blended solutions is also a factor and will vary depending upon the particular inorganic and the particular organic components, as well as the ratios in which they are blended. Blends were considered unstable if they did not retain stability after being placed in an oven at 40° C. for 20–30 days. However, many of these blends are stable at room temperature. Most aluminum chloride and alum blends of the organic polymers specifically described herein are relatively more stable and more cost-effective than ferric chloride and ferric sulfate blends. Ferric chloride with some polymers produces instant precipitation upon mixing and therefore is not suitable when blended with such polymers. However, a simple test will show whether or not the organic or inorganic components are compatible.

While the blends produced in accordance with the invention are useful in reducing water turbidity levels in both high turbidity water and low turbidity water they are especially useful in low turbidity water clarification applications in which most organic coagulants do not reduce water turbidity levels to the desired range. In the past, alum and other inorganic coagulants have been used for this type of application. However, the alum sludge and other inorganic sludges are often too bulky and too fine for handling. Blends of the inorganic and organic coagulants alleviate this problem.

The invention is hereby claimed as follows:

1. A composition for reducing turbidity in turbid waters consisting essentially of an aqueous solution of:
   (a) a substance selected from the group consisting of aluminum chloride, aluminum sulfate, ferric chloride and ferric sulfate, and
   (b) a water soluble organic positively charged polymeric coagulant having an average molecular weight of at least 2000 which is a polydiallyl dimethylammonium chloride polymer,
   the weight ratio of (a) to (b) being within the range of 0.75:1 to 4:1.

2. A composition as claimed in claim 1 in which the substance of (a) is aluminum chloride.

3. A composition as claimed in claim 1 in which the substance of (a) is aluminum sulfate.

4. A composition as claimed in claim 1 in which the substance of (a) is ferric sulfate.

5. A composition as claimed in claim 1 in which the organic positively charged polymeric coagulant of (b) has an average intrinsic viscosity from 0.08 to 1.0.

6. A process for preparing a composition for reducing turbidity in turbid waters consisting essentially in mixing together:
   (a) a substance selected from the group consisting of aluminum chloride, aluminum sulfate, ferric chloride and ferric sulfate dissolved in water to give a solution of 18% to 40% by weight solids concentration, and
   (b) a water soluble organic positively charged polymeric coagulant having an average molecular weight of at least 2000 which is a polydiallyl dimethylammonium chloride polymer, dissolved in water,
the quantity of (a) in said composition being within the range of 80%–60% by weight and the quantity of (b) being within the range of 20%–40% by weight, (a) and (b) making a total of 100% by weight, with the further proviso that the weight ratio of said substance of (a) to said polymeric coagulant of (b) is within the range of 0.75:1 to 4:1.

7. A process as claimed in claim 6 in which the substance of (a) is dissolved in water to give a solution of 18%–25% by weight solids concentration.

8. A process as claimed in claim 6 in which the substance of (a) is aluminum chloride.

9. A process as claimed in claim 6 in which the substance of (a) is aluminum sulfate.

10. A process as claimed in claim 6 in which the substance of (a) is ferric sulfate.

11. A process as claimed in claim 6 in which the organic positively charged polymeric coagulant of (b) has an average intrinsic viscosity from 0.08–1.0.

12. A process for reducing turbidity in turbid waters which comprises adding to said waters in an amount sufficient to reduce the turbidity of said waters a composition consisting essentially of an aqueous solution of (a) a substance selected from the group consisting of aluminum chloride, aluminum sulfate, ferric chloride and ferric sulfate, and (b) a water soluble organic positively charged polymeric coagulant having an average molecular weight of at least 2000 which is a polydiallyl dimethylammonium chloride polymer, the weight ratio of (a) to (b) being within the range of 0.75:1 to 4:1.

13. A process as claimed in claim 12 in which the turbidity of said waters does not exceed 200 ppm and the quantity of said composition added to said waters is sufficient to reduce turbidity at least to 10 NTU.

14. A process as claimed in claim 12 in which said turbid waters have a low turbidity of not more than 20 ppm of suspended solids and the quantity of said composition added to said waters is sufficient to reduce the turbidity until the NTU is not more than 5.

15. A process as claimed in claim 12 in which said composition is a blend in aqueous solution of a substance selected from the group consisting of aluminum chloride, aluminum sulfate, ferric chloride and ferric sulfate blended with an organic positively charged polymeric coagulant which is a polydiallyl dimethylammonium chloride polymer having an average intrinsic viscosity from 0.08 to 1.0.

* * * * *